United States Patent
Adachi

Patent Number: 5,391,992
Date of Patent: Feb. 21, 1995

[54] MEASURING DEVICE FOR ABSOLUTE MEASUREMENT OF POSITIONS

[75] Inventor: Satoshi Adachi, Kawasaki, Japan

[73] Assignee: Mitutoyo Corporation, Tokyo, Japan

[21] Appl. No.: 117,770

[22] Filed: Sep. 8, 1993

[30] Foreign Application Priority Data

Sep. 14, 1992 [JP] Japan .................. 4-270912

[51] Int. Cl.$^6$ .................................. G01R 27/26
[52] U.S. Cl. .................... 324/660; 345/95; 340/870.37
[58] Field of Search ............... 324/660–661, 324/725, 683–690; 340/870.37; 345/94

[56] References Cited

U.S. PATENT DOCUMENTS

| | | | |
|---|---|---|---|
| 3,936,815 | 2/1976 | Kogure et al. | 345/94 |
| 4,477,805 | 10/1984 | Arton et al. | 345/94 |
| 4,676,602 | 6/1987 | Watanabe | 345/94 |
| 4,748,444 | 5/1988 | Arai | 345/94 |
| 4,777,483 | 10/1988 | Fowler | 345/184 |
| 4,879,508 | 11/1989 | Andermo | |

*Primary Examiner*—Maura K. Regan
*Attorney, Agent, or Firm*—Oliff & Berridge

[57] ABSTRACT

A measuring device for absolute measurement of positions is disclosed, which comprises a displacement sensor having a fixed element and a movable element which is relatively movable against the fixed element and being adapted to output a signal corresponding to the relative position of the movable element against the fixed element, demodulators for processing the output signal of the displacement sensor so as to obtain cyclic square signals for detecting at least two types of displacement of coarse scale and fine scale, each edge of the square signals having phase information, phase detectors for detecting phase information from each square signal obtained by the demodulators so as to obtain phase data of at least coarse scale and fine scale, a composing circuit for composing phase data of the coarse scale and fine scale obtained by the phase detectors so as to obtain an absolute displacement of the movable element against the fixed element, a display portion for displaying the absolute displacement obtained by the composing circuit at predetermined refresh cycles, and a control circuit having a timer for limiting the period of the operation of the demodulators and the phase detectors for sampling phase data.

4 Claims, 5 Drawing Sheets

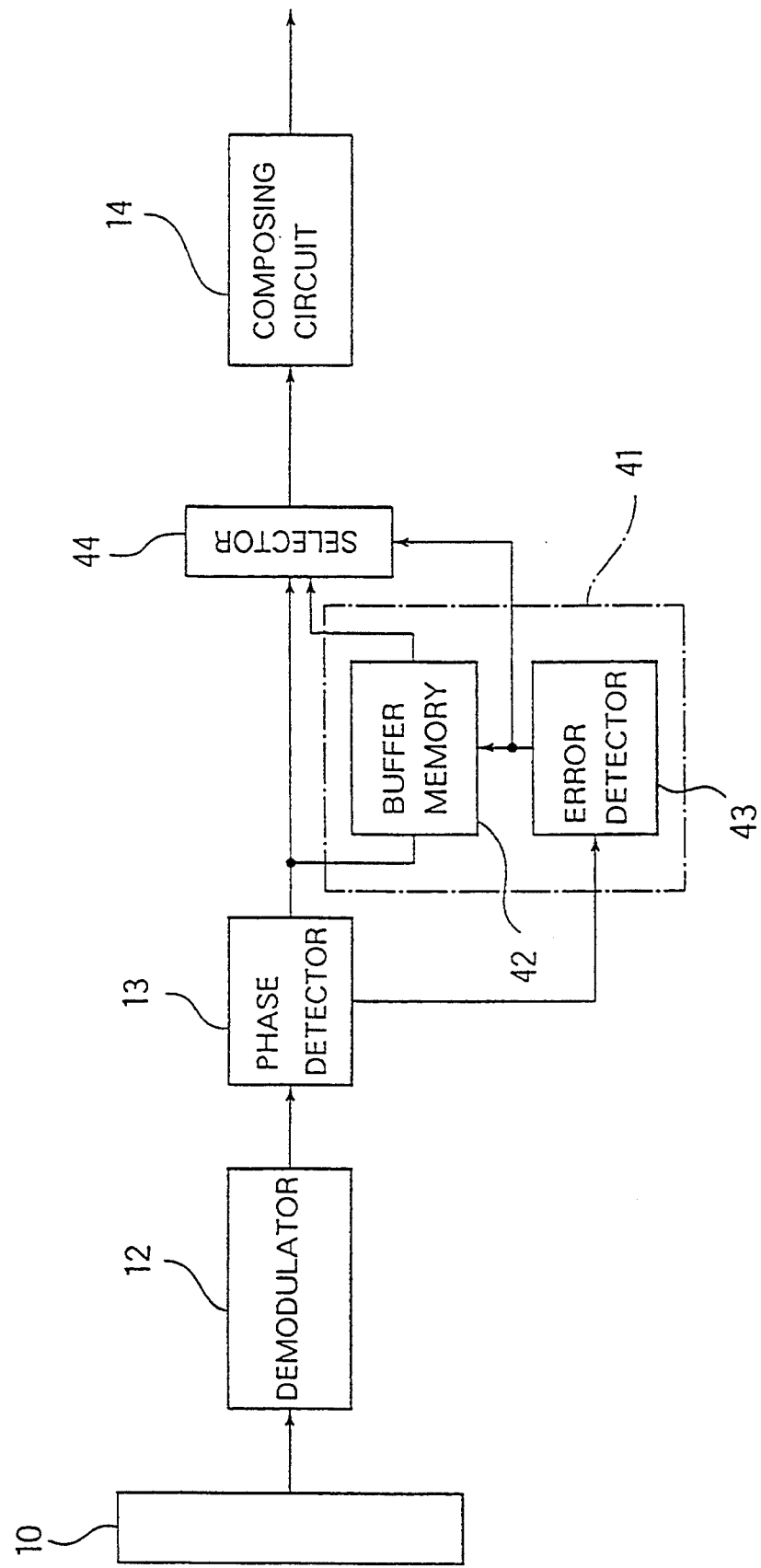

MEASURING DEVICE FOR ABSOLUTE MEASUREMENT OF POSITIONS

BACKGROUND OF THE INVENTION

The present invention relates to a displacement measuring device for use with small measuring devices such as digital vernier calipers, in particular, to a so-called absolute displacement measuring device for measuring absolute displacement of a movable element against a fixed element.

In small measuring devices (such as digital vernier calipers, digital micrometers, and height gauges), capacitance-type displacement sensors have been increasingly used. A capacitance-type displacement sensor comprises a fixed element (such as a main scale) and a movable element which relatively moves against the fixed element (such as a slider). On the fixed element and the movable element, a large number of electrodes are disposed in respective patterns. As the movable element moves against the fixed element, signals which represent cyclic variations of capacitance created between electrode patterns are detected and thereby a displacement is obtained.

Such displacement sensors are categorized as two types which are incremental type and absolute type which differ in the formats of output signals thereof. In the incremental-type displacement sensor, as the slider moves from a reference position, cyclic signals take place. By continuously measuring the cyclic signals, the displacement is measured. On the other hand, in the absolute-type displacement sensor, the absolute displacement (position) of the movable element against the fixed element is obtained without necessity of the continuous counting operation of the cyclic signals. In the absolute-type displacement sensor, corresponding to the shapes of electrode patterns formed on the fixed element and the movable element, cyclic signals with coarse pitches (coarse scale signals), cyclic signals with medium pitches (medium scale signals), and cyclic signals with fine pitches (fine scale signals) are output. By composing phase information of these cyclic signals, an absolute displacement of the movable element can be detected. The theory of such a capacitance-type absolute displacement sensor is disclosed in for example U.S. Pat. No. 4,879,508 and the like.

In the absolute-type displacement measuring device, the above-described coarse scale signals, medium scale signals, and fine scale signals are demodulated as square cyclic signals with phase information at their edges. When the phases of these cyclic signals are detected, the phases of leading edges and trailing edges of the cyclic signals are detected several times and then averaged. This is because these operations can prevent the phase information from being affected by the offset of an operational amplifier of a demodulator and display values from fluctuating due to data variation.

When the slider of the displacement sensor relatively moves against the main scale (this operation is referred to as the movement of the displacement sensor), the period of each signal obtained by the demodulator is prolonged or shortened. The degree of the variation of the signal period is varied depending on the moving direction of the displacement sensor. This is because although the frequency of excitation signal of the capacitance-type displacement sensor is constant, the movement of the displacement sensor causes the output signal to frequency modulate depending on the variation of the opposed relation of transmitter electrodes and receiver electrodes. The variation of the signal period is large in the order of the fine scale signals, medium scale signals, and coarse scale signals. Since the signal period is varied, the period for sampling phase data varies depending on whether the displacement sensor stops or is moving.

Thus, the period for sampling phase data (by detecting leading edge and trailing edge) in the condition that the sensor is moving is longer than that in the condition that the sensor stops.

As described above, in the absolute-type displacement measuring device, when the displacement sensor moves in a particular direction at high speed, sampling of necessary phase information takes a long time. If an analog circuit operates for sampling phase data in such a long time, the power consumption of the device would increase. If the display refresh cycle is varied according to the sampling period of phase data, the phase data could not be regularly displayed. If the display refresh cycle is set too long in consideration of the variation of phase data sampling period, data would not properly follow the movement of the sensor and thereby the display thereof would be unnatural.

SUMMARY OF THE INVENTION

An object of the present invention is to solve the problem which results from the variation of sampling period of phase data and to provide an absolute-type displacement measuring device which consumes less electric power and smoothly displays data.

A first aspect of the present invention is a measuring device for absolute measurement of positions, comprising a displacement sensor having a fixed element and a movable element which is relatively movable against the fixed element and being adapted to output a signal corresponding to the relative position of the movable element against the fixed element, demodulators for processing the output signal of the displacement sensor so as to obtain cyclic square signals for detecting at least two types of displacement of coarse scale and fine scale, each edge of the square signals having phase information, phase detectors for detecting phase information from each square signal obtained by the demodulators so as to obtain phase data of at least coarse scale and fine scale, a composing circuit for composing phase data of the coarse scale and fine scale obtained by the phase detectors so as to obtain an absolute displacement of the movable element against the fixed element, a display portion for displaying the absolute displacement obtained by the composing circuit at predetermined refresh cycles, and a control circuit for limiting the period of the operation of the demodulators and the phase detectors for sampling phase data.

A second aspect of the present invention is the absolute-type displacement measuring device of the first aspect further comprising a dummy phase data generator for generating dummy phase data so as to supplement phase data which is sampled in the operation period limited by the control circuit.

According to the present invention, in an absolute-type displacement measuring device, a time limit is designated to a phase data sampling operation so that a fixed optimal display refresh cycle is obtained. Thus, regardless of whether the displacement sensor stops or is moving, measured values can be smoothly displayed. In addition, a time limit is designated to each of demodulators and phase detectors, the power consumption thereof can be effectively reduced. In particular, the power consumption is remarkably reduced in the demodulators which are analog circuits.

If a time limit is designated to the phase data sampling operation, while the displacement sensor is moving at high speed, phase data may not be sampled in occasions. In this case, the phase data is preferably combined with dummy phase data. Thus, even if the displacement sensor moves at high speed, data can be properly displayed without affections to the composing and displaying of data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF DRAWINGS

FIG. 6 is a block diagram showing the construction of principal portions including a dummy phase data generator according to the embodiment.

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

Next, with reference to the accompanying drawings, an embodiment of the present invention will be described.

Figure 1:
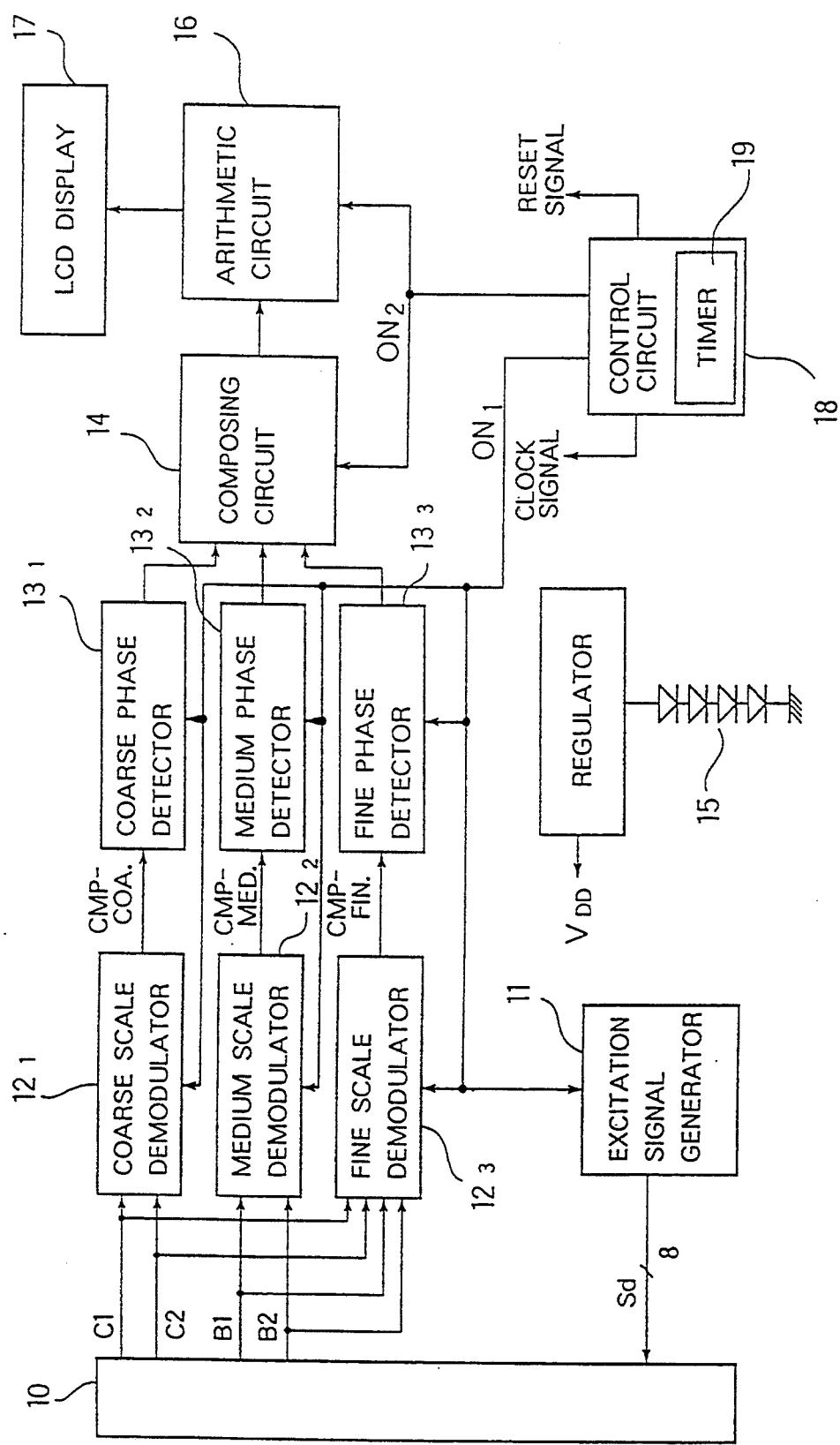
FIG. 1 is a block diagram showing the construction of a capacitance-type displacement measuring device according to an embodiment of the present invention.
Figure 2A:
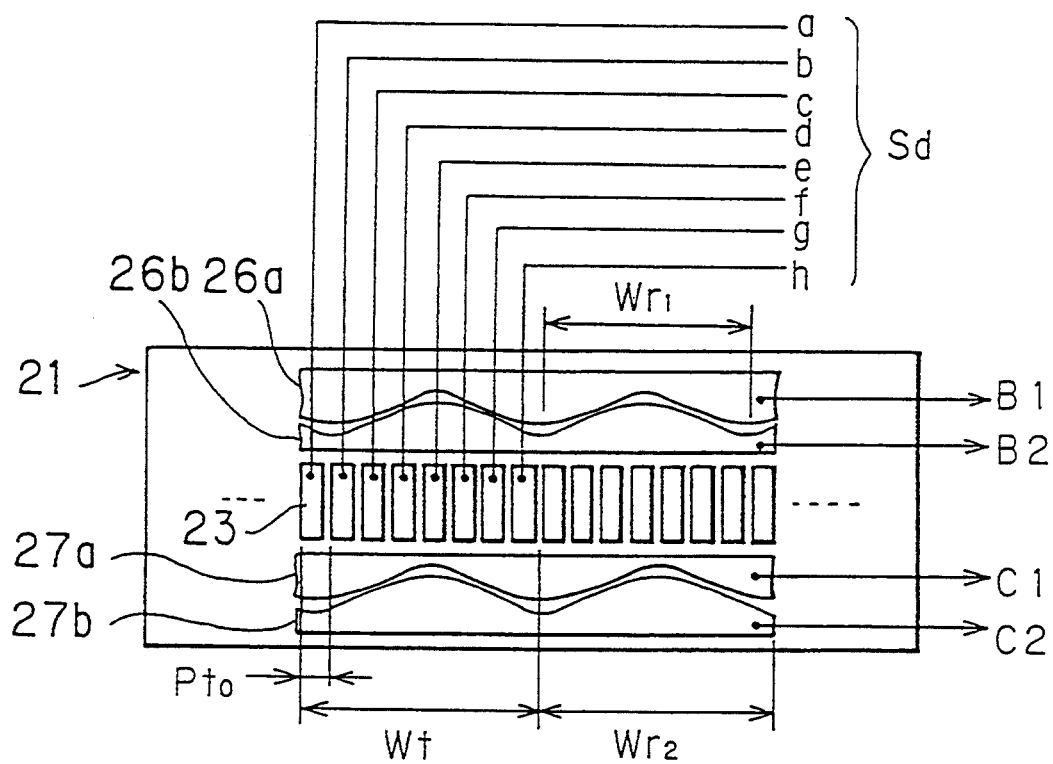
FIG. 2A is a schematic diagram showing the construction of a slider of an ABS sensor according to the embodiment.
Figure 2B:
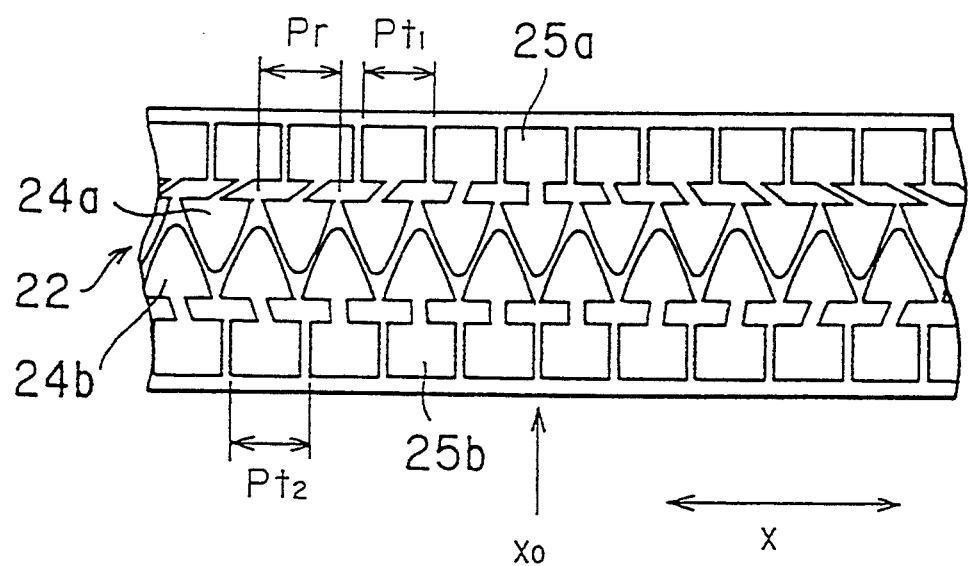
FIG. 2B is a schematic diagram showing the construction of a main scale of the ABS sensor according to the embodiment.

FIG. 1 shows the system construction of a displacement measuring device according to an embodiment of the present invention. FIGS. 2A and 2B show the construction of a capacitance-type absolute displacement sensor (hereinafter referred to as the ABS sensor) 10.

The ABS sensor 10 comprises a main scale 22 and a slider 21. The main scale 22 is a fixed element as shown in FIG. 2B, whereas the slider 21 is a movable element as shown in FIG. 2A. The slider 21 is opposed to and spaced apart from the main scale 22 by a small distance. The slider 21 is movable in x direction (measuring axis) of the main scale 22. On the slider 21, first transmitter electrodes 23 are disposed at pitches Pt0. In addition, on the slider 21, detector electrodes 26a, 26b, 27a, and 27b are disposed. On the main scale 22, receiver electrodes 24a and 24b are disposed at pitches Pr. In addition, on the main scale 22, second transmitter electrodes 25a and 25b are disposed at pitches Pt1 and Pt2, respectively. The first transmitter electrodes 23 are capacitance-coupled with the receiver electrodes 24a and 24b. The receiver electrodes 24a and 24b are connected to the respective second transmitter electrodes 25a and 25b in one-by-one relation. The second transmitter electrodes 25a and 25b are capacitance-coupled with the detector electrodes 26a, 26b, 27a, and 27b.

Every eight first transmitter electrodes 23 are commonly connected so as to form a plurality of eight-electrode groups. An excitation signal Sd consisting of eight cyclic signals a, b, . . . , and h whose phases differ each other by 45° is supplied to each eight-electrode group. In other words, the excitation signal Sd is a signal where a sine wave signal has been chopped by high frequency pulses. The excitation signal Sd is generated by an excitation signal generator 11 shown in FIG. 1 and output therefrom.

Pitches Wt of electric field patterns which take place at the first transmitter electrodes 23 by the excitation signal Sd are eight times higher than the pitches Pt0 of the transmitter electrodes 23. The pitches Wt are N times higher than the pitches Pr of the receiver electrodes 24a and 24b. The value of N is preferably an odd number such as 1, 3, 5, and so forth. In this embodiment, the value of N is designated to 3. Thus, successive eight transmitter electrodes 23 are capacitance-coupled with three or four receiver electrodes 24a or 24b at all times. The receiver electrodes 24a and 24b are triangle-shaped or sine-shaped electrodes and disposed alternately as shown in FIG. 2B. The phases of signals received by the receiver electrodes 24a and 24b depend on the capacitance-coupling areas between the first transmitter electrodes 23 and the corresponding receiver electrodes 24a and 24b. These coupling areas vary depending on the relative position of the slider 21 against the main scale 22.

When the pitches of the receiver electrodes 24a and 24b are the same as the pitches of the second transmitter electrodes 25a and 25b, the detector electrodes 26a, 26b, 27a, and 27b detect cyclic signals which are generated whenever the X position of the main scale 21 deviates for the pitch Pr. In the ABS sensor 10 according to this embodiment, to detect three levels of displacement which are coarse scale, medium scale, and fine scale, the second transmitter electrodes 25a and 25b have offsets D1 and D2 for the corresponding receiver electrodes 24a and 24b, respectively. The offsets D1 and D2 are functions with respect to the distance x measured from a reference position x0. Thus, the following formulas are obtained.

$$D1(x) = (Pr - Pt1)x/Pr$$

$$D2(x) = (Pr - Pt2)x/Pr$$

Therefore, the second transmitter electrodes 25a and 25b have such offsets to the receiver electrodes 24a and 24b. In addition, the pitches of waveform patterns of the detection electrodes 26a, 26b, 27a, and 27b are set so that the relations of Wr1=3Pt1 and Wr2=3Pt2 are satisfied. Consequently, the detector electrodes 26a and 26b output signals B1 and B2 where short periods corresponding to the waveform patterns of the detector electrodes 26a and 26b are superimposed on long periods corresponding to the offset D1(x), respectively. Likewise, the detector electrodes 27a and 27b output signals C1 and C2 where short periods corresponding to waveform patterns of the detector electrodes 27a and 27b are superimposed on long periods corresponding to the offset D2(x), respectively.

The phases of the longer period components of the signals B1 and B2 are inverse, whereas the phases of the shorter period components thereof are the same. In other words, a longer period signal is obtained by subtracting one signal from the other signal, whereas a shorter period signal is obtained by adding these signals. This can apply to the detection signals C1 and C2. When the electrode patterns are set so that the longer periods of the detection signals B1 and B2 are several ten times larger than the shorter periods and that the longer periods of the detection signals C1 and C2 are several ten times larger than the longer periods of the detection signals B1 and B2, each level of displacement can be obtained by the following expressions.

C1−C2 [Coarse scale]
B1−B2 [Medium scale]
(B1+B2)−(C1+C2) [Fine scale]

The basic construction and theory of operation of the above-described ABS sensor are the same as those described in the above-mentioned U.S. Pat. No. 4,879,508.

The arithmetic output signal (C1−C2) is processed by a coarse scale demodulator $12_1$ and a coarse phase detector $13_1$. The arithmetic output signal (B1+B2) is processed by a medium scale demodulator $12_2$ and a medium phase detector $13_2$. The arithmetic output signal [(B1+B2)−(C1+C2)] is processed by a fine scale demodulator $12_3$ and a fine phase detector $13_3$. Each demodulating process is performed by a sampling process with a chop frequency of the excitation signal, a mixing process, a filtering process of the low frequency component, a digitizing process, and so forth. Thereafter, a cyclic square signal CMP having phase information at an edge thereof is generated. In this embodiment, three types of cyclic signals which are a coarse scale signal CMP-COA., a medium scale signal CMP-MED., and a fine scale signal CMP-FIN. are obtained. The phase detectors $13_1$, $13_2$, and $13_3$ each detect the phase information of the leading edge and the trailing edge of the scale signal by referencing the excitation signal Sd having a phase of 0° received from the excitation signal generator 11. The detected phase information is averaged and phase data of each scale signal is output as digital values.

Each phase data of digital values obtained by the phase detectors $13_1$ to $13_3$ is corresponding to the displacement to be measured. The phase data is weighted and composed by the composing circuit 14. The composing circuit 14 receives an offset value from an offset memory (not shown) which is an EEPROM chip or the like. Thus, the composing circuit 14 adjusts the offset amount of the composed value. The output of the composing circuit 14 is sent to an arithmetic circuit 16. For example, the arithmetic circuit 16 converts the displacement into the real size value. The arithmetic circuit 16 is connected to a control circuit 18 (such as a microcomputer) through an interface (not shown). The values obtained by the arithmetic circuit 16 are displayed on an LCD display 17.

In this embodiment, as a DC power supply 15, a solar battery or conventional battery is used.

The control circuit 18 is provided with a timer 19. The timer 19 sets the period of the display refresh cycle. In the display refresh cycle, the phase data sampling period and the composing and displaying period are fixed to predetermined values. The control circuit 18 generates activation signals $ON_1$ and $ON_2$. The activation signal $ON_1$ operates the excitation signal generator 11, the demodulators $12_1$, $12_2$, and $12_3$, and the phase detectors $13_1$, $13_2$, and $13_3$ at predetermined intervals. On the other hand, the activation signal $ON_2$ operates the composing circuit 14 and the arithmetic circuit 16. Thus, the data sampling operation is performed at the predetermined intervals. The control circuit 18 supplies to each circuit the activation signals which turns on and off each circuit along with a reset signal, clock signal, and so forth so as to control the entire system operations.

Figure 3:
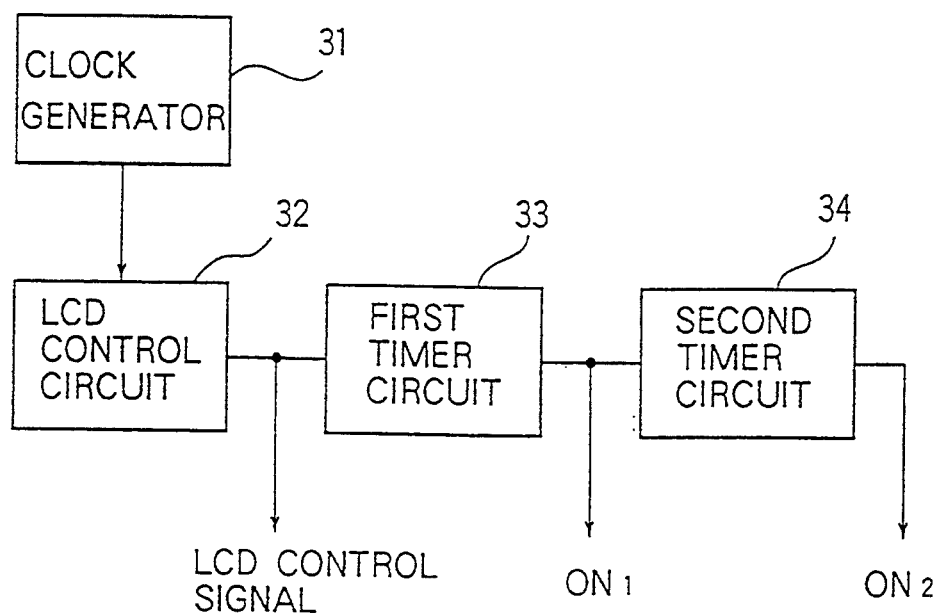
FIG. 3 is a block diagram showing the construction of a practical example of a timer according to the embodiment.

FIG. 3 shows a more practical functional block of the timer 19 with which the control circuit 18 is provided. The timer 19 comprises a clock generator 31, an LCD control circuit 32, a first timer circuit 33, and a second timer circuit 34. The clock generator 31 generates a basic clock signal. With the basic clock signal, the LCD control circuit 32 generates an LCD control signal which designates the period of the display refresh cycle. The LCD control circuit 32 is constructed of for example a counter which counts the basic clock signal. The output of the LCD control circuit 32 is connected to the first timer circuit 33 and then the second timer circuit 34 in series. The first timer circuit 33 generates the activation signal $ON_1$ which turns on the demodulator 12 and the phase detector 13. The second timer circuit 34 generates the activation signal ON2 which turns on the composing circuit 14 and the arithmetic circuit 16. Each of the timer circuits 33 and 34 can be practically constructed of an edge detector and a delay circuit.

Figure 4:
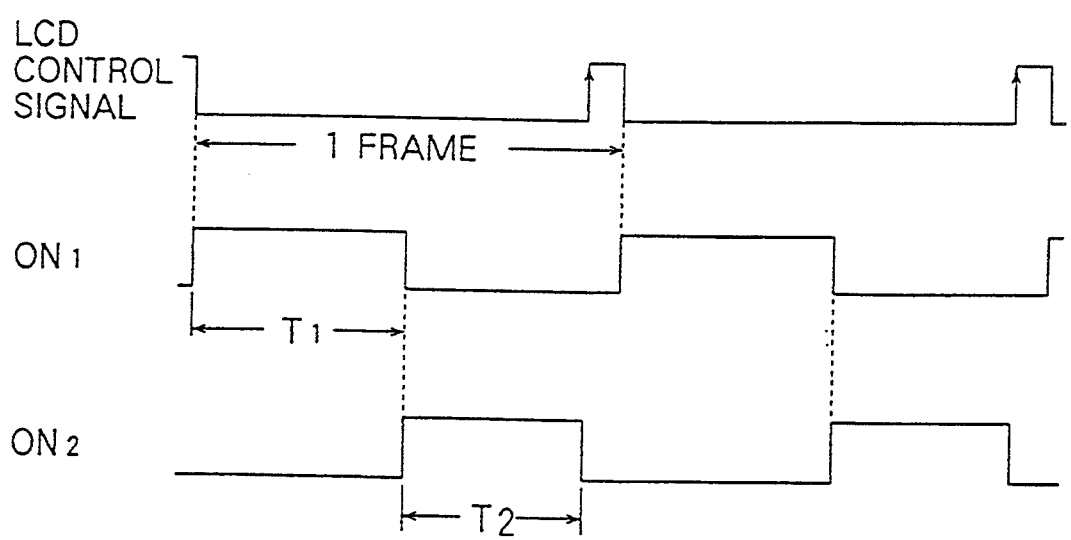
FIG. 4 is a timing chart showing an operation of the device according to the embodiment.

As shown in FIG. 4, one cycle of the LCD control signal is corresponding to one frame of the refresh cycles. The level of the activation signal $ON_1$ is high for a predetermined period T1 of the refresh cycles. After the level of the activation signal $ON_1$ becomes low, the level of the activation signal $ON_2$ becomes high for a predetermined period T2.

Figure 5:
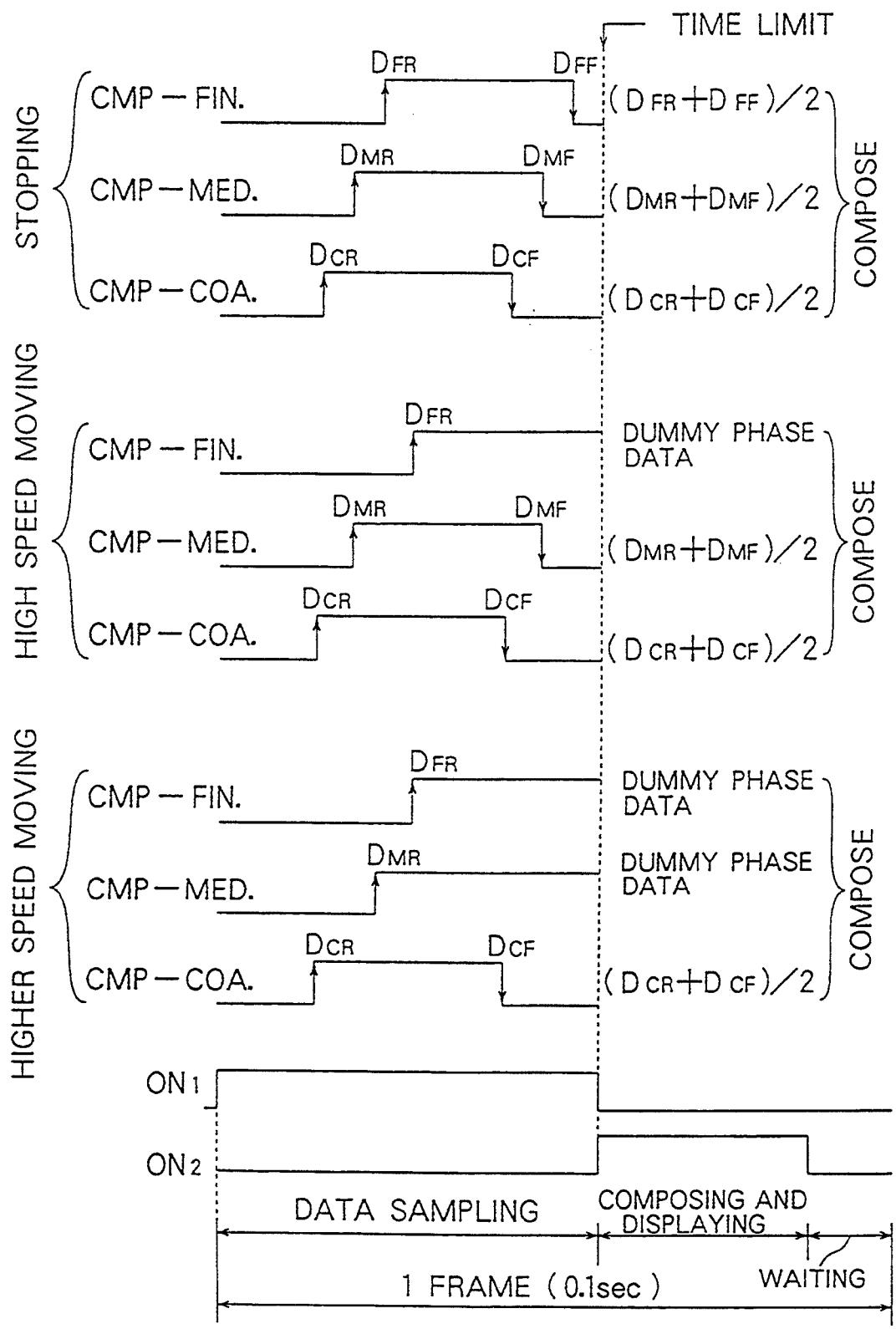
FIG. 5 is a timing chart showing a measuring operation of the device according to the embodiment.

FIG. 5 shows wave forms of signals for use in a practical measuring operation controlled by the control circuit 18 of the ABS sensor according to this embodiment.

In the case that the period of one frame of the display refresh cycles is too long, as the ABS sensor moves, measured values can not follow the sensor movement to be unnaturally displayed. In the case that the period of one frame of the display refresh cycles is too short, as the ABS sensor moves at high speed, data cannot be sampled. Thus, in this embodiment, the period of one frame of the display refresh cycles is experimentally designated to 0.1 sec.

In the display refresh cycles, the high level period of the activation signal $ON_1$ for sampling data is fixed to a value in the range from 40 to 50 msec. Likewise, the high level period of the activation signal $ON_2$ for composing and displaying data is designated to a value in the range from 40 to 50 msec. The remaining period of one frame of the display refresh cycles is a waiting period. The waiting period is not mandatory. In other words, first the period of one frame of the display refresh cycles is designated. Next, the data sampling period and the data composing and displaying period are designated. Thus, the remaining period becomes the waiting period.

As shown in FIG. 5, a time limit is designated to the period of the data sampling operation corresponding to the activation signal $ON_1$. When the sensor stops, as shown in the upper column of FIG. 5, in the range of the time limit, for all scale signals, phase information of leading edges and trailing edges thereof ($D_{FR}$, $D_{FF}$), ($D_{MR}$, $D_{MF}$), and ($D_{CR}$, $D_{CF}$) can be sampled. For each scale, the phases at leading edge and trailing edge are averaged so as to sample the phase data.

On the other hand, corresponding to the moving speed and moving direction of the ABS sensor, the period of the output signal obtained by each of the demodulators $12_1$, $12_2$, and $12_3$ varies. The period of the output signal is proportional to the moving speed of the ABS sensor. The period of signal is most varied in the order of the fine scale signal CMP-FIN., medium scale signal CMP-MED., and coarse scale signal CMP-COA.

For example, if the sensor moves at high speed in a particular direction, as shown in the middle column of FIG. 5, the period of the fine scale signal CMP-FIN. becomes long. Thus, in the time limit, the phase information at trailing edge $D_{FF}$ cannot be sampled. If the sensor moves at much higher speed, as shown in the lower column of FIG. 5, phase information at trailing edges $D_{FF}$ and $D_{MF}$ Of the fine scale signal CMP-FIN. and the medium scale signal CMP-MED. cannot be sampled.

In this embodiment, when the phase data sampling operation is not completed in the above-described time limit, dummy phase data is used to supplement the incomplete phase data. For example, the latest data of a plurality of past display refresh data or independently generated data is used as the dummy data.

For example, as shown in the middle column of FIG. 5, when the phase data cannot be sampled from the fine scale signal CMP-FIN., dummy phase data is used along with the phase data of the medium scale signal CMP-MED. and coarse scale signal CMP-COA. so as to perform the composing process. In this case, although a low order digit of the value displayed on the display is not accurate, as with the case that the real phase data is used, the value is naturally displayed. FIG. 6 shows the construction of an example of a data composing portion using dummy phase data. In this figure, one of the coarse, medium, and fine scale systems of FIG. 1 is exemplified. In the real device, three systems of phase detectors with the same construction are disposed between the ABS sensor 10 and the composing circuit 14. As shown in the figure, the phase detector 13 is followed by a dummy phase data generator 41. The dummy phase data generator 41 comprises a buffer memory 42 and an error detector 43. The buffer memory 42 primarily stores phase data obtained by the phase detector 13 for at least one frame of refresh cycles, preferably a plurality of frames of refresh cycles. The error detector 43 detects an error of phase detecting and controls the reading operation for the buffer memory 42. The output of the phase detector 13 or the output of the buffer memory 42 is selected by a selector 44 to be sent to the composing circuit 14.

While phase data is being correctly detected (for example, the sensor stops), the phase data obtained by the phase detector 13 is sent to the composing circuit 14 through the selector 44. If the sensor moves at high speed and thereby phase data cannot be detected in the time limit, the error detector 42 issues an error detection signal. The buffer memory 42 is controlled by the error detection signal so that the latest phase data stored therein is read as dummy data. In addition, the selector 44 is switched by the error detection signal. Thus, the dummy data as phase data is sent to the composing circuit 14.

While the sensor is moving at high speed, since dummy phase data is used, the composed data includes an error. However, while the sensor is moving at high speed, data on the display is successively updated. In particular, the low order digits of data rapidly change. Thus, while the sensor is moving, when data on the display is refreshed with an accuracy that a simple increase or a simple decrease thereof is identified, the user can naturally see data on the display. When the sensor finally stops, correct data is displayed. Thus, even if the data on the display is inaccurate while the sensor is moving, it does not matter.

In the embodiment, as the dummy phase data for the complementary to the case that phase data could not be sampled in the time limit, phase data which was sampled in the preceding cycle was used. However, it should be noted that another data may be used as dummy phase data. In this case, if a fixed data such as "0" was used, the composed data would be even or odd. Thus, the data is unnaturally displayed. To allow data to be naturally displayed, dummy phase data is preferably random data.

In the embodiment, data of three scales, which were coarse, medium, and fine, were sampled and composed. However, it should be noted that the present invention may be applied to the case that data of two scales which are coarse and fine are sampled and composed.

As described above, according to the present invention, since a time limit is designated to the phase data sampling operation and the period of each frame of display refresh cycles is optimally designated, an absolute-type displacement measuring device which properly displays measured values regardless of whether the displacement sensor stops or is moving and which reduces average current consumption. In addition, since a time limit is designated to the phase data sampling operation, phase data which cannot be sampled is supplemented with dummy phase data. Thus, even if the sensor moves at high speed, data can be naturally displayed.

Additional advantages and modifications will readily occur to those skilled in the art. Therefore, the invention in its broader aspects is not limited to the specific details, representative devices, and illustrated examples shown and described. Accordingly, departures may be made from such details without departing from the spirit or scope of the general inventive concept as defined by the appended claims and their equivalents.

What is claimed is:

1. A measuring device for absolute measurement of positions, comprising:

displacement sensing means having a fixed element and a movable element which is relatively movable against said fixed element and being adapted to output a signal corresponding to the relative position of said movable element against said fixed element;

demodulation means for processing the output signal of said displacement sensing means so as to obtain cyclic square signals for detecting at least two types of displacement of coarse scale and fine scale, each edge of the square signals having phase information;

phase detection means for detecting phase information from each square signal obtained by said demodulation means so as to obtain phase data of at least coarse scale and fine scale;

composing means for composing phase data of the coarse scale and fine scale obtained by said phase detection means so as to obtain an absolute displacement of said movable element against said fixed element;

display means for displaying the absolute displacement obtained by said composing means at predetermined refresh cycles; and control means for limiting the period of the operation of said demodulation means and said phase detection means regardless of whether said phase information is sampled, said control means including timer means for designating the period of said refresh cycles, for activating said demodulating means and said phase detection means for a predetermined period in said refresh cycles, and for successively activating said composing means for a predetermined period.

2. A measuring device for absolute measurement of positions, comprising:

displacement sensing means having a fixed element and a movable element which is relatively movable against said fixed element and being adapted to output a signal corresponding to the relative position of said movable element and said fixed element;

demodulation means for processing the output signal of said displacement sensing means so as to obtain cyclic square signals for detecting at least two types of displacement of coarse scale and fine scale, each edge of the square signals having phase information;

phase detection means for detecting phase information from each square signal obtained by said demodulation means so as to obtain phase data of at least coarse scale and fine scale;

composing means for composing phase data of the coarse scale and fine scale obtained by said phase detection means so as to obtain an absolute displacement of said movable element against said fixed element;

display means for displaying the absolute displacement obtained by said composing means at predetermined refresh cycles;

control means for limiting the period of the operation of said demodulation means and said phase detection means regardless of whether said phase information is sampled, said control means including timer means for designating the period of said refresh cycles, for activating said demodulating means and said phase detection means for a predetermined period in said refresh cycles, and for successively activating said composing means for a predetermined period; and dummy phase data generation means for generating dummy phase data so as to supplement phase data which is sampled in the operation period limited by said control means.

3. A measuring device according to claim 2, wherein said control means has timer means for designating the period of said refresh cycles, activating said demodulation means and said phase detection means for a predetermined period in said refresh cycles, and successively activating said composing means.

4. A measuring device for absolute measurement of positions, comprising:

displacement sensing means having a fixed element and a movable element that is relatively movable against said fixed element and being adapted to output a signal corresponding to the relative position of said movable element and said fixed element;

demodulation means for processing the output signal of said displacement sensing means so as to obtain cyclic square signals for detecting at least two types of displacement of coarse scale and fine scale, each edge of the square signals having phase information;

phase detection means for detecting phase information from each square signal obtained by said demodulation means so as to obtain phase data of at least coarse scale and fine scale;

composing means for composing phase data of the coarse scale and fine scale obtained by said phase detection means so as to obtain an absolute displacement of said movable element against said fixed element;

display means for displaying the absolute displacement obtained by said composing means at predetermined refresh cycles;

control means for limiting the period of the operation of said demodulation means and said phase detection means regardless of whether said phase information is sampled, said control means including timer means for designating the period of said refresh cycles, for activating said demodulation means and said phase detection means for a predetermined period in said refresh cycles, and for successively activating said composing means for a predetermined period; and dummy phase data generation means for generating dummy phase data so as to supplement phase data that is sampled in the operation period limited by said control means, wherein said dummy phase data generation means comprises:

buffer memory means for primarily storing the phase data obtained by said phase detection means for at least one frame of said refresh cycles;

selector means for switching one of the output of said buffer memory means and the output of said phase detection means and sending the selected output to said composing means; and error detection means for detecting a phase detection error of said phase detection means and performing a reading control for said buffer memory means and a switching control for said selector means.

* * * * *